No. 737,669. PATENTED SEPT. 1, 1903.
D. T. SHARPLES.
MILKING APPARATUS.
APPLICATION FILED FEB. 21, 1902.
NO MODEL. 2 SHEETS—SHEET 1.
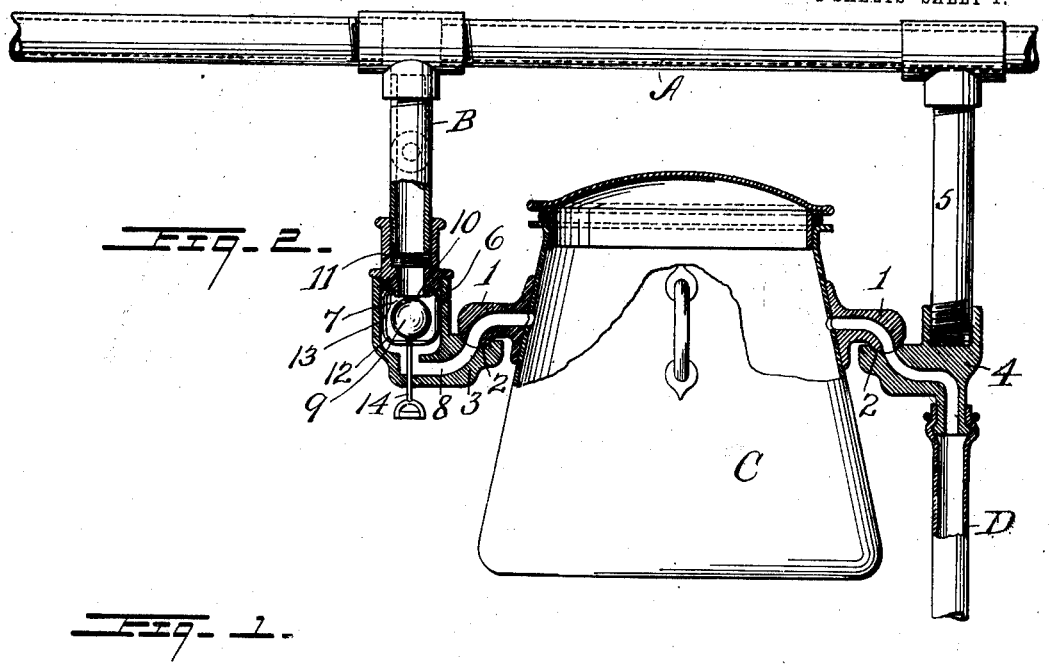
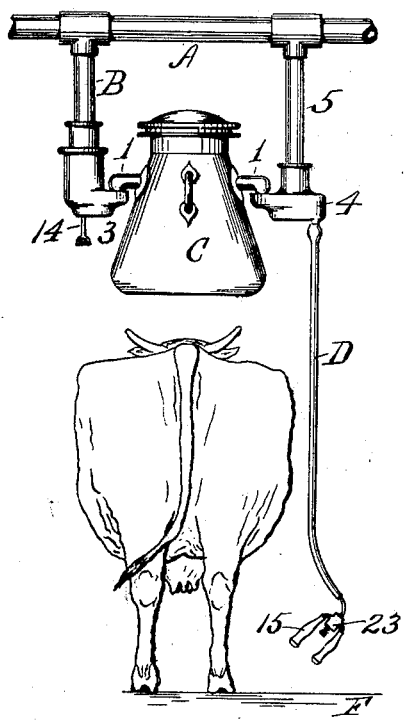
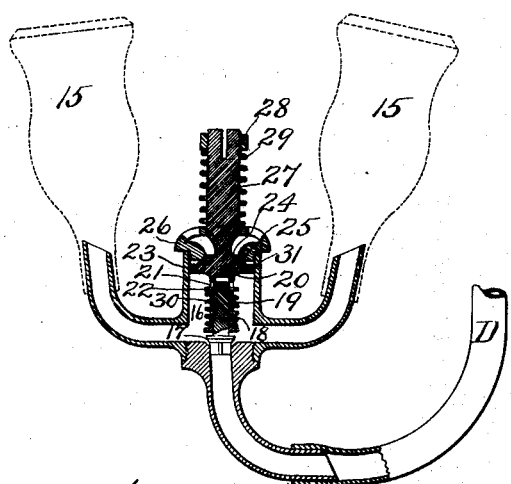
Witnesses
David T. Sharples Inventor
by
Attorney No. 737,669. PATENTED SEPT. 1, 1903.
D. T. SHARPLES.
MILKING APPARATUS.
APPLICATION FILED FEB. 21, 1902.
NO MODEL. 2 SHEETS—SHEET 2.
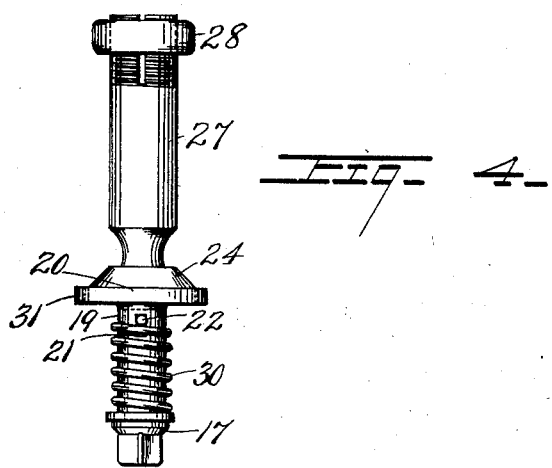
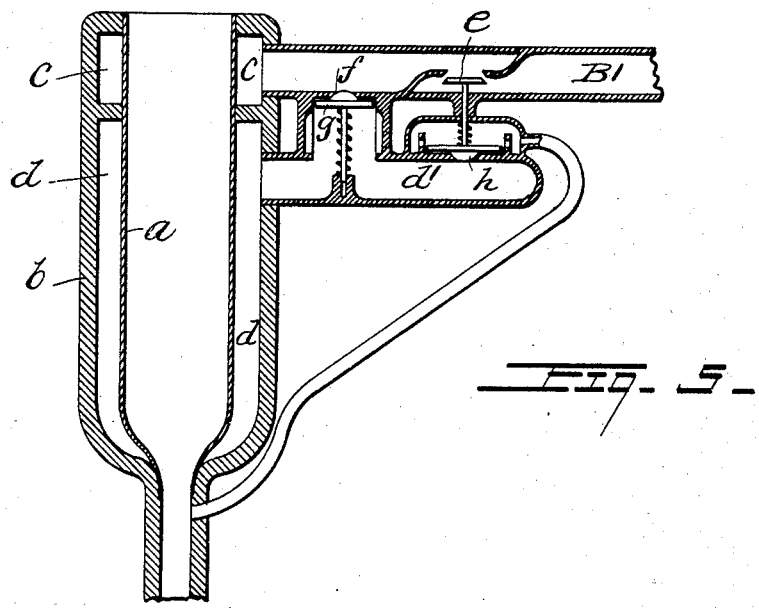

No. 737,669. Patented September 1, 1903.

UNITED STATES PATENT OFFICE.

DAVID TOWNSEND SHARPLES, OF WESTCHESTER, PENNSYLVANIA.

MILKING APPARATUS.

SPECIFICATION forming part of Letters Patent No. 737,669, dated September 1, 1903.

Application filed February 21, 1902. Serial No. 95,039. (No model.)

*To all whom it may concern:*

Be it known that I, DAVID TOWNSEND SHARPLES, a citizen of the United States, residing in Westchester, county of Chester, State of Pennsylvania, have invented certain new and useful Improvements in Milking Apparatus, of which the following is a specification.

My invention relates to cow-milking apparatus; and it consists in certain improvements, first, in the relative location and arrangement of the different parts of the system; second, in the pulsation-producing mechanism, and, third, in the communicating connections of the pipes to the milk-receptacle.

The important differences and advantages over apparatus heretofore devised will be referred to in connection with the detailed description of the invention as embodied in the construction shown in the accompanying drawings, and the novel features are particularly pointed out in the claims.

Figure 1 is a diagrammatic view of a pneumatic milking system embodying my improvements. Fig. 2 is an elevation, partly in section, showing a portion of the main air-pipe with my improved milk-pail connections thereto. Fig. 3 is a similar cross-sectional view of the teat-cup mechanism, including my improved pulsating apparatus as adapted to a suction or vacuum system. Fig. 4 is an enlarged detail view of the combined piston and valve device shown in Fig. 3. Fig. 5 shows a modified pulsating apparatus adapted for use in connection with a system employing compressed air instead of the usual vacuum system.

A represents a portion of a main line of air-pipe arranged in connection with a pump or reservoir for maintaining therein an approximately uniform vacuum. B is one of the valved branch pipes therefrom arranged in connection with the upper portion of a milk pail or receptacle C, which latter is also in connection with a milk-pipe D, the end of which is provided with teat-cup connections for the cow or cows to be milked thereby. These features are commonly employed in milking apparatus.

One very important consideration in such apparatus is the insuring of perfect cleanliness in the milk and apparatus. In order mainly to attain this result more certainly and conveniently than heretofore, I preferably arrange the main parts of the apparatus in the relation indicated in Fig. 1, in which it will be noticed the milk-receptacle C is shown suspended beneath the overhead main air-pipe A, with the milk-pipe D depending therefrom and of such length as to support the pendent teat-cups when they are disconnected from the cow's teats above the floor F of the stall, so that they are not liable, as usual, to fall to the floor and to be trampled upon or otherwise soiled, but, on the contrary, are always supported in convenient position for connection to the cow's teats when desired. The milk-receptacle C is also supported in elevated position above the cow, as shown, free from danger of accidental contact, the milk being elevated thereto by the operating pressure.

For conveniently supporting and connecting and disconnecting the milk-receptacle I employ, as particularly shown, the following construction: Near the top of the milk-pail I provide hollow arms or trunnions 1 1, the ends of which are adapted to form air-tight bearings in seats 2 2, formed, respectively, in the lower end piece 3 of the communicating branch pipe B and in the opposite supporting connection 4, which latter is carried, as shown, by a carrier 5, secured to the pipe A, and has connected to it the communicating milk-pipe D, which depends therefrom. To close or open the branch pipe B, I preferably employ the novel form of valve shown, the object being to provide for closure of the same automatically, either by the removal of the milk-pail or by the overfilling of the latter, as well as the convenient opening of the same for the milking operation. This valve as specially devised for a suction-operated system comprises a body 6, forming part of the end piece 3 and formed with a valve-chamber 7, located above the port 8, which communicates with the milk-pail. In this chamber is located a float-valve 9, which closes against a seat 10, formed, as shown, in the bottom of a hollow cap or top 11, which serves to connect the valve-body 6 to the branch pipe B. This float-valve moves freely in an open cage 12 in said chamber, the inwardly-turned upper end 13 of which permits the valve to be pulled away from its seat to open communication with the pail by the pulling of the cage itself downward by means of a stem 14, which depends through a corresponding opening in the bottom of the valve-body. The operation of this valve is as follows: When the pail is in position and the valve 8 opened, as stated, by pulling the cage 12 downward the milking operation begins as usual, the teat-cups being applied to the cow, and continues, as hereinafter more fully described, until the cow is completely milked or until the pail is filled above the level of the opening in the hollow trunnion 1. In the latter case the overflow rises in the valve-chamber 7 and floats the valve 8 to its seat, thus cutting off communication with the main pipe A and stopping the milking action. The valve-cage 12 will have been normally raised after being pulled downward to open the valve by the suction on the stem 14. When the milking is completed, the mere removal of the pail from its pivotal seats 2 will cause the valve to be closed by the inflow of air through port 8 toward the vacuum-pipe B, and this result will obviously follow also in case of any break or the like suddenly admitting air from any part of the system through said port 8.

It is generally accepted that a pulsating action of the teat-cups is practically essential to a successful automatic milking apparatus, and various mechanisms have heretofore been devised for producing such action. Such mechanisms, however, have failed to provide for other important requirements, as I have described, of a satisfactory milking apparatus. In the first place, I have found that it is important to practically confine the pulsating action to the teat-cups themselves, thus maintaining an approximately uniform vacuum or pressure in the milk-receptacle and the milk-pipes connected thereto, as well as in the main and branch air-pipes of the system, and, in the second place, that the pulsating action should be such as to produce a relatively quick easing of the grip of the teat-cups on the teats to allow the refilling of the latter as required and a relatively slow increase of pressure thereon to withdraw the milk, and, further, that these successive actions should also be automatically varied in the frequency of their repetition in sympathy with the condition and will of the cow and the consequent ease with which the milk is withdrawn. These and other advantages my improved apparatus is designed to secure, and I will now proceed to describe the invention as embodied in the suction-operated pulsating mechanism illustrated in Fig. 3.

The teat-cups 15 are all connected, as shown, to a common teat-cup chamber 16, about which they are grouped and which is in valve-controlled communication with the milk-tube D, by which the cups and pulsating mechanism are carried, and with the connected milk-receptacle and vacuum-pipes B and A. The check-valve 17, as shown, is provided to restrict the capacity of the milk-tube D, which also serves as a passage-way for the air exhausting from the teat-cups and chamber 16 and to automatically shut off the latter when the maximum vacuum has been attained and the relief or air-inlet valve 20, hereinafter referred to, is opened. It is formed, as shown, with a stem 18, which is in telescopic engagement with the hollow stem 19 of a relief-valve 20, by which it is adapted to be moved, though capable of a limited independent movement controlled by a spring 30. This spring is arranged to normally hold the check-valve 17 in its nearest position to the valve 20, but permits of a movement of the latter against the increasing tension of the spring within the limits of a slot 21 in the hollow stem 19, which guides projections 22 22 on the inclosed stem 18. The relief-valve 20 comprises a piston portion 23, which fits within the cylindrical chamber 16, and a conical portion 24, which seats in a corresponding opening 25 in the head 26 of the chamber-body, and it is provided with a projecting stem 27, having an adjusting-nut 28 at its upper end, and an inclosing spring 29, which is arranged to normally press the valve 20 against the seat 25. Air inlet or inlets 31 are provided through the piston 23 to the chamber 16.

The operation of this pulsating mechanism is as follows: In the positions shown the relief-valve 20 is closed and check-valve 17 held only slightly open, the spring 30 being compressed under the suction or pressure on said valve 17, due to the difference in pressures between the teat-cup chamber 16 and the remainder of the system. The vacuum in the system operating through the open check-valve 17, while tending to produce a corresponding vacuum in the teat-cup region, (comprising the teat-cups and chamber 16,) produces a suction on the cow sufficient to cause the milk to flow and only increasing as greater compression of the teat-cups is required to secure this result. Thus if the cow allows the milk to flow easily this increase of the vacuum in the teat-cup region will be correspondingly slow, while, on the other hand, if the flow is not easy and more frequent compression of the teats is required, as is apt to be the case when the cow's milk is nearly exhausted, the vacuum is more quickly increased in the teat-cup region to the point at which it is intended to relieve it, and thereby to reëxpand the teat-cups preparatory to renewing the milking action. In any case as the vacuum in the teat-cups is increased the opening of the valve 17 is gradually increased, the tension of the spring 30 overcoming the reduced suction on it and pushing it up into its normal position in the socketed relief-valve stem 19, and whenever the maximum-vacuum point is reached in the chamber 16 the atmospheric pressure on the exposed valve portion 24 of the relief-valve 20 overcomes the tension of spring 29 and slightly opens it, admitting atmospheric air against the increased area of the piston portion 23 and so pressing the latter downward, together with the check-valve 17, until the latter is seated and communication with the vacuum system thus cut off. The air-pressure on the relief-valve 20, however, is reduced as the air passes through the restricted opening or openings 31 in the piston and reduces the vacuum beneath it until the tension of spring 29 overcomes the said pressure and raises the whole relief-valve 20 as far as is permitted by the clearance in slot 21 of the hollow stem, the spring 30 being compressed by this movement, but the suction on check-valve 17 preventing it from being immediately raised from its seat, as is necessary in order to permit the entire closing of the relief-valve at 24. The latter thus remains slightly open, still permitting air to enter the chamber 16 until the vacuum in the latter is reduced to the minimum, when the spring 29 overbalances the air-pressure on piston-valve 23 and also the suction on the check-valve 17 and slightly raises the latter in moving tightly to the seat 25, thus bringing the parts again to the position indicated in the drawings, in readiness for a repetition of the operation as just described.

In order that there may be no "dead-center" or intermediate point of equilibrium, the air-inlets 31 in the piston 23 should be made of greater capacity than the minimum opening of the check-valve 17, thus insuring the final seating of the relief-valve 20. It will be readily understood also that the area of the valve 24 which is exposed to atmospheric pressure when the valve is closed should be greater than that of the check-valve 17 and that the area of the piston 23 should be in such proportion to that of the valve 24 that the pressure on the former at the maximum vacuum in chamber 16 will overcome the spring 29, while, on the other hand, said spring will overcome the pressure on piston 23 at the minimum vacuum, as well as the suction on the valve 17. The tension of the spring 29 may be readily adjusted as desired by means of the nut 28.

From the foregoing description of my invention as embodied in the construction illustrated in Fig. 3 of the drawings it will be seen that the invention provides for attaining radically new and important results in the art to which it relates, as has been previously referred to. The field of varying pressures being confined to the teat-cup space only, of which the connecting-chamber 16 in the construction shown forms a part, all surging of the milk in the milk-tubes, as well as all variation of pressure in the whole system of pipes and tubing, is avoided, only a minimum expenditure of power is required, and the pulsating action produced is direct and certain. The novel character of this pulsating action, however, is of special importance, this action being variable in sympathy with the condition and will of the cow instead of being arbitrarily fixed by the positive operation of the mechanism. The frequency of the pulsations thus varies automatically in accord with the amount of action required to secure the withdrawal of the milk from the cow, and inasmuch as this increases as the supply of milk approaches exhaustion the increased frequency of the pulsations serves to call the attention of the operator to this fact, and thus enable him to promptly disconnect the apparatus. Nor is it to be understood that my improvements are only applicable in connection with a vacuum system, as they may also be adapted to a compressed-air system, as indicated, for instance, in the modified construction illustrated in Fig. 5.

In this modification the pulsating mechanism is shown connected directly to a teat-cup formed so as to be operated by compressed air instead of a vacuum system. Said cup comprises an inner collapsible portion $a$ and a relatively rigid outer portion $b$, forming between them a small annular chamber $c$ near the top and a separate larger one, $d$, below it. The compressed air enters chamber $c$ from pipe B' through an open valve $e$. When the maximum pressure is reached, a valve $f$ opens slightly and then wider as the pressure comes onto piston $g$, which admits the pressure to the connected chambers $d$ and $d'$ until maximum is nearly reached in the latter, when valve $h$ is similarly opened, simultaneously closing valve $e$ and exhausting the pressure in the teat-cup chambers to the minimum, at which valves $h$ and $f$ automatically close and $e$ opens preparatory to repeating the operation. The valve $h$ should open on a somewhat less pressure than $f$, so that the chamber $c$ may exhaust before $h$ closes. The exhaust-air may be passed into the teat-cup to force the milk to an elevation, if desired.

The sympathetic action of the pulsating mechanism is due to the fact that both the milk and the air flow through the same restricted passage-way, the effect of this novel arrangement being to automatically decrease the rapidity of the air-flow when there is a flow of milk from the cow in proportion to the volume of the latter, and thus correspondingly vary the frequency of the pulsations. The passage-way for air becomes more restricted as the milk-flow is increased, and the exhaustion of air from the teat-cups and chamber is consequently less rapid, so that a longer time is required to bring the pressure there to the maximum at which release automatically takes place than is required when the flow of milk is reduced or stopped, thus increasing the time consumed in each compression of the teats and causing the number of pulsations in a given time to automatically vary as the freedom of the milk-flow varies. The capacity of the joint passage-way for the milk and air must be limited, so that this restriction of the air-flow may result from the increase of the milk-flow, and vice versa; but it is not essential that this limitation should be effected in the manner indicated in the preferred construction shown and described. For instance, if the valve 17 were dispensed with and the outlet to or through tube D otherwise restricted to a proper area the time required to exhaust the teat-cups and chamber to the maximum would be varied, as described. The release of the teats to the minimum pressure is, however, always effected quickly, the difference in the time required for a pulsation being due to the difference in time required to attain the maximum pressure at which relief automatically takes place. To keep up the milking operation, it is only necessary to keep up the vacuum or pressure in the air system to pump air, the pulsating mechanism operating automatically, as a safety-valve does. There is no positive or mechanical operation of this mechanism; but it is free to operate at such intervals as the varying circumstances determine, a main element of which is the condition or mood of the particular cow with which this pulsating mechanism is in communication. This fact makes the term "sympathetic action" an appropriate one to apply to the operation of my improved apparatus, one which clearly distinguishes from the action of apparatus heretofore devised for the purpose, and this sympathetic action is believed to be essential to the satisfactory operation of a milking apparatus. The operation is truly automatic instead of mechanical and radically different from previous pulsating mechanisms, which have been arranged to operate indirectly, as by a pneumatic motor, instead of being directly actuated and which are regularly and positively operated instead of irregularly and sympathetically.

It will be readily understood that the spirit of my invention includes various modifications of the preferred construction and arrangement which I have specifically described.

What I claim is—

1. A pneumatic milking system for a cow-stable comprising an overhead air-pipe, a branch pipe rigidly depending therefrom and provided with a pail-supporting end piece, a milk-pail pivotally carried upon said end piece, and a connected tube having terminal teat-cups, depending from said pail.

2. In a pneumatic milking system the combination with the air-pipe, of a pivotally-supported pail having a hollow arm forming a pivotal air-tight connection with said air-pipe, and a milk-tube arranged in communication with said pail and provided with teat-cups.

3. In a pneumatic milking apparatus the combination with an air-pipe and a milk-pail in communication therewith, of a float-valve in said air-pipe arranged to be automatically closed by any sudden inlet of air to the connected milk-pail substantially as set forth.

4. In a pneumatic milking apparatus the combination with an air-pipe and a milk-pail in communication therewith, of a float-valve in said pipe arranged to be automatically closed either by a sudden inlet of air to the pail or by an overflow of liquid therefrom substantially as set forth.

5. In a suction-operated milking apparatus the combination with an air-pipe and a milk-pail in communication therewith of a valve device in said pipe comprising a valve-chamber, a float-valve therein, and a movable cage for said valve having a projecting handle portion substantially as set forth.

6. In a pneumatic milking apparatus comprising an air-conduit system, the combination with the teat-cups and connected milk-tube of an intermediately-located directly-actuated pneumatic pulsating mechanism.

7. In a pneumatic milking apparatus comprising an air-conduit system a milk-tube carrying terminal teat-cups and also a directly-actuated pneumatic pulsating mechanism therefor.

8. A pneumatic milking apparatus embracing a teat-cup chamber having a relief-valve and a connected tube arranged in communication with the milk-receptacle and with the air system, and serving as a passage-way for both milk and air, said passage-way being restricted in cross-sectional area so as to limit its capacity to approximately the maximum milk-flow.

9. A pulsating mechanism for a pneumatic milking apparatus comprising an air-chamber arranged in connection with the teat-cups and the air system and an automatically-operated relief-valve in said chamber arranged to open only at the maximum pressure and to automatically close at minimum pressure.

10. A pneumatic milking apparatus embracing a teat-cup chamber having a relief-valve and a connected conduit arranged in communication with the milk-receptacle and with the air system, the air-inflow opening of said relief-valve being greater than the outflow-opening of said conduit.

11. In a pneumatic milking apparatus the combination with the teat cup or cups of an automatic pulsating mechanism comprising a chamber arranged in free communication with said teat-cups and separate valves controlling communication with the pneumatic system and the atmosphere respectively, said valves being arranged to automatically open alternately at minimum and maximum pressures respectively.

12. In a pneumatic milking apparatus the combination with a group of teat-cups, of a chamber at the junction thereof, a milk-tube connected to said chamber, and a pulsating mechanism located in said chamber, said mechanism comprising a check-valve controlling the milk-tube opening, and an air-inlet valve operatively connected to said check-valve.

13. In a pneumatic milking apparatus the combination with the teat cup or cups of a chamber arranged in communication therewith and provided with a milk-outlet and an air-inlet, and separate valves for said outlet and inlet operatively connected but having limited independent movements.

14. In a pneumatic milking apparatus the combination with the teat cup or cups of a chamber arranged in communication therewith and provided with a milk-outlet and an air-inlet, and separate valves for said outlet and inlet operatively connected but having limited independent movements and separate movement-controlling springs therefor.

15. In a pneumatic milking apparatus the combination with the teat cup or cups of a chamber arranged in communication therewith and provided with alined milk-outlet and air-inlet openings, separate valves for said openings seating in opposite directions and slidingly connected, a spring controlling the relative movement of said valves, and a separate spring controlling the movement of the air-inlet valve, substantially as set forth.

In testimony whereof I affix my signature in the presence of two witnesses.

DAVID TOWNSEND SHARPLES.

Witnesses:
S. W. MOLLACK,
M. E. RUPERT.